INVENTORS.
Arthur P. Fraas
John J. Tudor
BY
ATTORNEY

INVENTORS.
Arthur P. Fraas
BY   John J. Tudor

ATTORNEY.

July 7, 1964

A. P. FRAAS ETAL 3,140,238

CHARGING AND SERVICE MACHINE FOR GAS-COOLED REACTORS

Filed Oct. 26, 1962

INVENTORS.
Arthur P. Fraas
John J. Tudor

BY

ATTORNEY.

INVENTORS.
Arthur P. Fraas
John J. Tudor
ATTORNEY.

INVENTORS.
Arthur P. Fraas
John J. Tudor
ATTORNEY.

United States Patent Office 3,140,238
Patented July 7, 1964

3,140,238
CHARGING AND SERVICE MACHINE FOR
GAS-COOLED REACTORS
Arthur P. Fraas, Knoxville, and John J. Tudor, Oak Ridge,
Tenn., assignors to the United States of America as
represented by the United States Atomic Energy
Commission
Filed Oct. 26, 1962, Ser. No. 233,495
3 Claims. (Cl. 176—30)

The present invention relates to charging and service machines generally and more specifically to charging and service machines for neutronic reactors cooled by gases or liquids.

Characteristic of prior art charging and servicing systems is the existence of separate mechanisms for the charging and servicing operations. Charging machines of the prior art systems have not been amenable to performing servicing functions, thereby necessitating the use of separate servicing machines which increase the cost and complexity of the system.

Most charging or servicing machines presently known require a plurality of core pressure vessel penetrations to obtain core access. A serious problem which arises with multiple pressure vessel penetrations is one of indexing the penetrations relative to each other and to the core. Exact indexing is necessary in order to locate fuel channels and insert fuel elements in their proper positions without jamming or breakage. The very close dimensional tolerances required are extremely difficult to obtain in large pressure vessels. Thermal expansion and warpage from uneven thermal expansion are additional serious complicating factors which threaten the practicability of this type of system. Another serious problem is posed by the stress concentrations which are present in the regions surrounding the vessel penetrations. Stress concentrations can lead to pressure vessel failure and are an especially critical problem where thermal cycling takes place as is the case when shutdowns or changes in power occur in a neutronic reactor.

Another undesirable feature generally found in prior art systems is the requirement that leak-tight locks and seals be placed at the pressure vessel penetrations. This feature becomes increasingly undesirable as the number of penetrations increase. The locks and seals are required to prevent contamination of uncontaminated areas by reactor coolant.

Still another difficulty arises when maintenance or replacement of a moving part in prior art charging or servicing systems is required. Extreme difficulty is sometimes encountered in removing and transporting parts to a hot cell where maintenance work can be performed. In many cases a major plant shutdown is required for such an operation.

Due to the necessarily small size of pressure vessel penetrations when a plurality of such penetrations are found in one pressure vessel, only a small number of fuel elements can be replaced simultaneously. Accordingly, a long period of time is required whenever a substantial number of fuel elements are replaced. Long refueling times are undesirable as they reduce the plant operating factor.

It is therefore a general object of the present invention to provide a single unit for both charging and servicing of neutronic reactors.

Another object of the invention is to provide a charging and servicing machine with a fixed position capable of charging and servicing an entire neutronic reactor core region.

Another object of the invention is to provide a charging and service machine which does not require gas locks or seals.

Still another object of the invention is to provide a charging and service machine in which no moving parts remain within the unshielded portion of the reactor.

A further object of the invention is to provide a charging and service machine in which a minimum number of moving parts are required to operate at high temperature and under severe gamma irradiation.

Another object of the invention is to provide a core charging and service machine in which all moving parts which must operate at high temperatures can be readily removed for servicing in a hot cell.

Another object of the invention is to provide a core charging machine which can load or unload simultaneously from 12 to 36 fuel channels in one operation through a single charge tube from 20 to 36 inches in diameter.

Still another object of the invention is to provide a charge machine capable of operating with the reactor cooling gas system temperatures close to their normal full-power values.

Other objects of the invention will become apparent from an examination of the following description of the invention and the appended drawings wherein.

The drawings are maintainly confined to illustrating details of the charging and service machine and show only as much of a nuclear reactor in which the charging and servicing machine is embodied as is necessary to illustrate the method of operation of the various mechanisms within the machine.

In accordance with the present invention, an improved charging and servicing machine for fluid-cooled neutronic reactors is provided which comprises in combination; a ram centrally postioned external to the reactor core, a plurality of detachable and interchangeable ram heads which can be individually mounted on one end of the ram and adapted to perform service or charging operations upon the reactor core, means for raising and lowering the ram, turntables providing for storage of fuel, ram heads and other special equipment disposed in a horizontal plane vertically positioned so that said equipment may be engaged by the end of the ram when said ram is in its withdrawn position, a plurality of radial tracks located on the turntables, track-mounted shuttle means communicating between the turntables and ram for transferring items therebetween, means for indexing any radial track on the turntable with the shuttle crack, means for radially and angularly positioning the ram heads, and means for operating the ram heads in charging and servicing operations.

Figure 1:
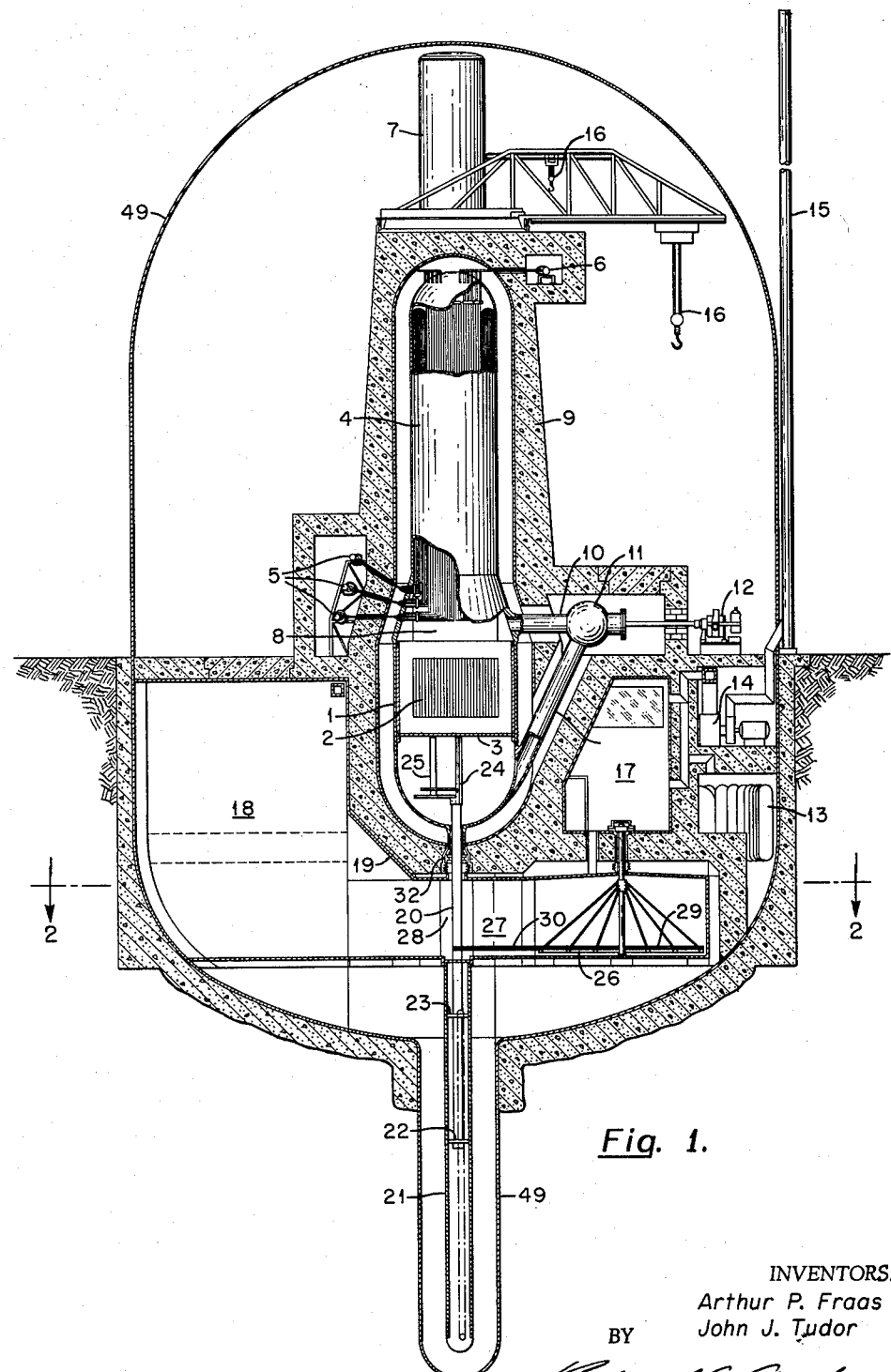
FIG. 1 shows a vertical sectional view of a proposed reactor which utilizes a charge and service machine according to the subject invention.

To facilitate an understanding of the invention, reference is made to the drawings wherein like reference characters are used throughout to designate like elements. A neutronic reactor having a charge and service machine according to the subject invention is shown in FIG. 1. The reactor embodiment of FIG. 1 is a proposed graphite moderated and helium-cooled unit designated the HGCR–5. A pressure vessel 1 encloses the graphite reactor core 2 which is supported by a core support plate 3. Mounted above the reactor core 2 is a steam generator 4 which is also enclosed by the pressure vessel 1. The steam generator 4 incorporates header drums 5 and reheater drums 6. Control rods are cable suspended from the drive unit 7 located on top of the shield over the steam generator. The rod drive cables pass through tubes which extend upward through the steam generator tube matrix from the top of the plenum 8 over the top of the reactor core, to the top of the pressure vessel 1. The top mounted control system has been selected to avoid interference with fuel handling operations below the reactor core. Concrete radiation shielding 9 is provided around all the radiation zones of the reactor. Ducts 10, blowers 11 and turbine drives 12 circulate the helium coolant gas through the reactor core and steam generator. Helium storage tanks 13 are provided in the annular space between the shielding and containment vessel. A building vent system 14 discharges gas through the stack 15. Cranes 16 provide lifting for heavy casks of irradiated fuel and reactor components and a containment shell 49 encloses the entire reactor system.

Some facilities closely related to and cooperating with the subject charging and servicing machine are the hot cells 17 and the core service area 18. A leak-tight steel envelope 19 seals the core service area, hot cells, and charge machine components from the remainder of the reactor building.

Although a detailed view of the subject charge and service machine is not possible in FIG. 1, the relative positions of major components can be illustrated including: the ram 20, ram drive housing 21, the ram carrier ring 22, ram guide ring 23, and a charge head 24 mounted on the ram. A fuel cartridge 25 is shown being carried by the charge head. Turntables 26 provide storage space for fresh and spent fuel and interchangeable ram heads for core charging and servicing operations. A shuttle zone 27 provides communication between the turntables and the central ram operation area 28.

Figure 2:
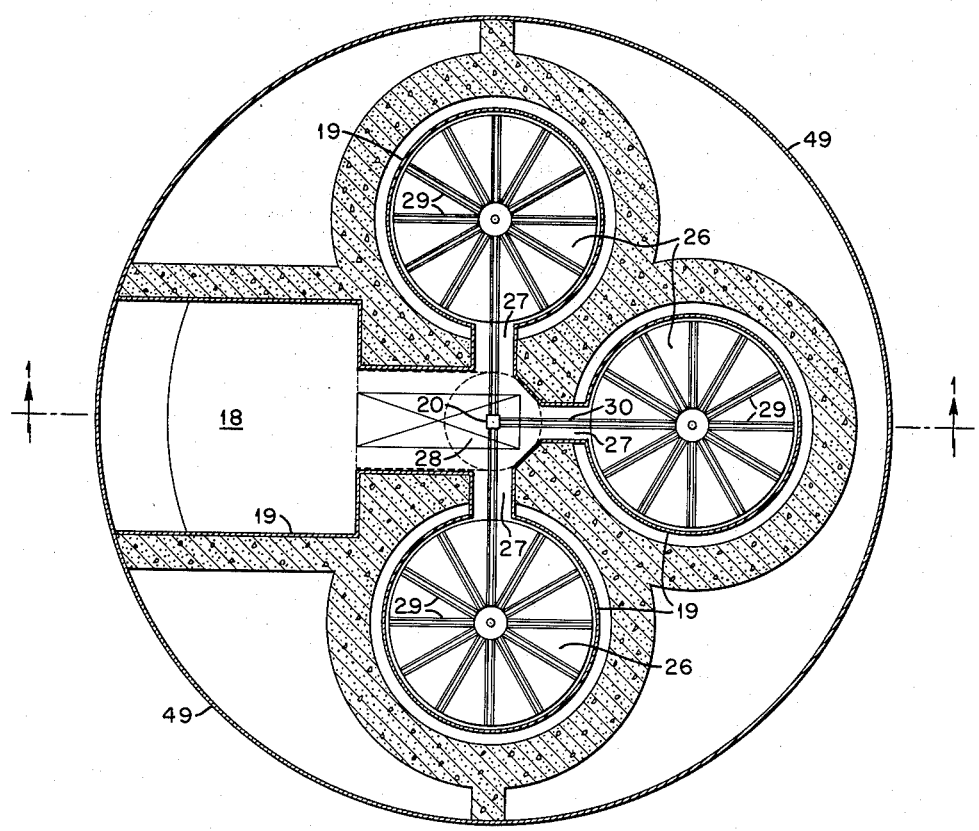
FIG. 2 shows a horizontal section of the reactor of FIG. 1 taken at the turntable level.

FIG. 2 shows three large turntables 26 which are provided at 90-degree intervals about the vertical center line of the reactor in chambers which communicate with the central ram operation area 28. Each turntable is provided with a plurality of radial tracks 29. Provision is made to index any given track 29 with the track 30 leading to the central ram operation area 28 through the shuttle zone 27, or position any track under the access to an overhead hot cell. The fourth quadrant of the area surrounding the ram contains a general core service area 18. The area immediately surrounding the ram is a shuttle zone 27 that communicates between the central ram operation area 28 and the turntable and service areas.

The system design is based on the plan that fuel cartridges to simultaneously fuel a large number of channels are mounted on trolleys which can be conveyed on tracks 29 and 30 from turntables 26 to the central ram operation area 28 immediately under the reactor. The ram 20 and charge head 24 serve to push the fuel cartridge assembly 25 up into the reactor pressure vessel in the region under the core; a radial arm positions the fuel cartridge assembly under a selected part of the core and the fuel elements are driven upward into their proper positions in a plurality of channels in the reactor. Fuel removal operations take place in essentially the reverse order.

The shield plug and pressure closure flange 31 mounted in the charge tube 32 directly under the reactor, permits pressurization of the reactor vessel 1 and provides shielding isolation of the shuttle zone 27 when the reactor is operating and the ram 20 is withdrawn into the ram well 21. The shield plug is shown in detail in FIG. 11.

FIG. 1 also shows the entire complex of shuttle zone, turntables, service area, hot cell and ram housing in an enclosure of light steel plate welded to form a leak-tight envelope 19.

A basic element of the subject charge and service machine is the ram assembly shown in FIGS. 1, 3, 4, and 5. The ram member 20 consists of a square tube having a length of about 45 feet and a wall thickness of about ¼ inch to give a light, yet stiff, structural element.

Figure 3:
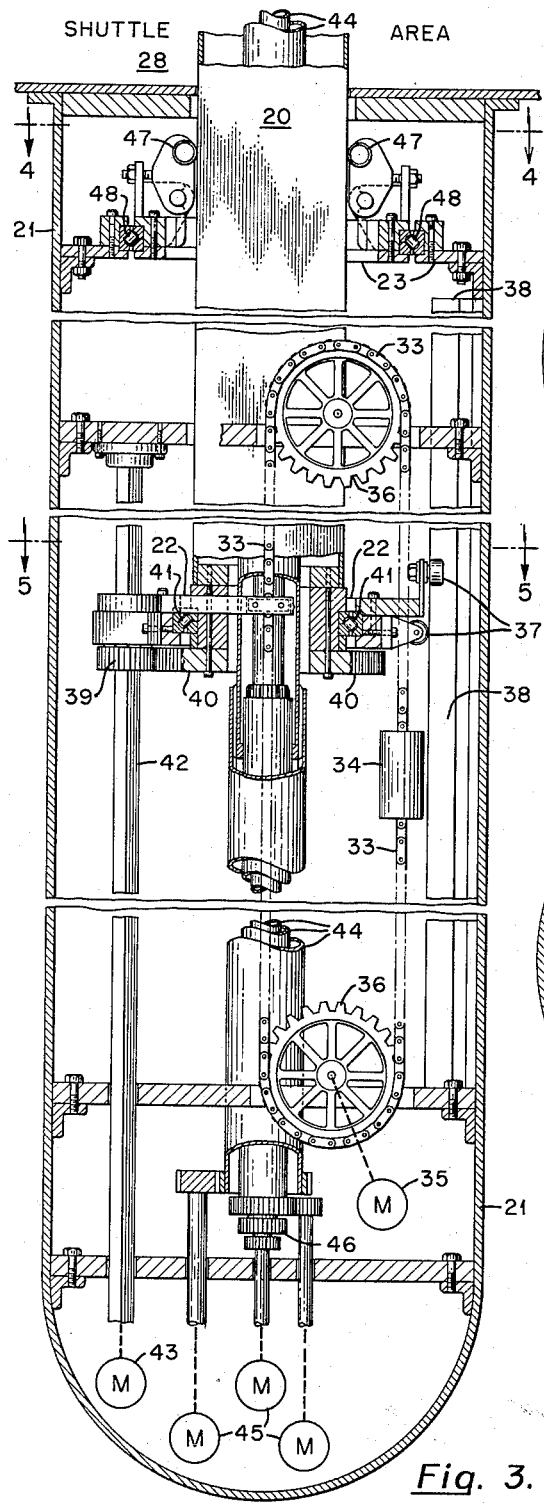
FIG. 3 is a cut-away view of the ram housing showing the ram and associated equipment.
Figure 5:
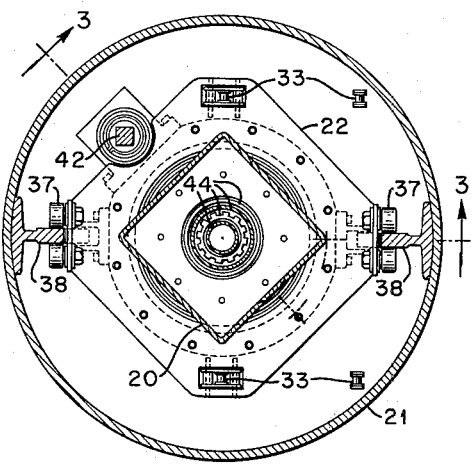
FIG. 5 is a horizontal sectional view of the ram housing of FIG. 3 taken immediately above the ram carrier ring.

FIG. 3 is a cut-away view of the ram well 21 showing the ram 20 and assorted equipment. Two roller chains 33 (only one shown) with counterweights 34 drive the ram. A strong positive ram drive is provided which operates either up or down with a mechanism which foundry service experience has shown to be simple, rugged and reliable even under such extreme environmental conditions as high temperatures and large amounts of grit. Worm drives with individual electric motors 35 are used on sprockets 36 to ensure accurate vertical positioning of the ram. A jaw-clutch on each worm drive can be disengaged to permit ram operation by the remaining drive motor. The ram carrier ring 22 shown in detail in FIG. 5 is provided with rollers 37 which ride against guide rails 38 as shown, to center the lower end of the ram and prevent rotation of the carrier ring. The ram tube is rotated relative to the carrier ring by the pinion gear 39 mounted in bearings attached to the carrier ring. This pinion engages a ring gear 40 mounted at the base of the ram. The ram is mounted on a large ball bearing 41 which is designed to provide for an upward thrust or a downward load. The pinion gear 39 is driven by a square shaft 42 sliding in a square hole in the center of the pinion trunnion. The shaft 42 is driven by an electric motor 43 which is flange-mounted under the base of the ram housing.

Figure 4:
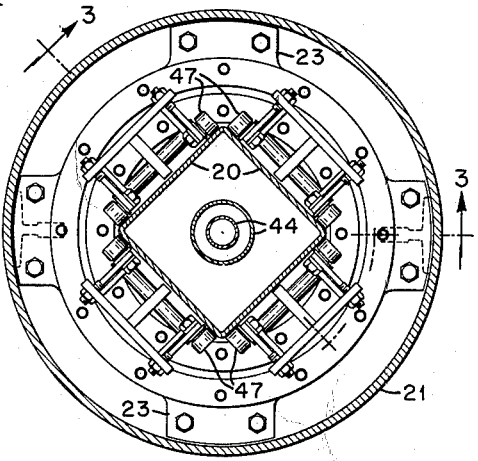
FIG. 4 is a horizontal sectional view of the ram housing of FIG. 3 taken immediately above the ram guide ring.

FIGS. 3 and 4 illustrate the upper ram guide ring 23 located at the top of the ram drive housing. The ram is aligned by the rails 38 carrying the carrier ring at the base of the ram and by the rollers 47 in the upper guide ring. Eight vertical rollers 47 in the inner portion of the upper ram guide ring center the ram and provide for axial motion. A ball bearing 48 permits rotation of the ram and inner ring assembly. The ram stroke is approximately 35 feet, and, to give good alignment, the base of the ram is at least 10 feet below the top guide ring when the ram reaches the top of its stroke.

Motion for any operation of equipment carried by the ram is transmitted through a set of two to four concentric shafts, as shown in FIG. 3, mounted at the center of the ram to make their operation independent of ram rotation. These shafts consist of telescoping tubes 44, the outboard ends of which are mounted in bearings. The lower set of tubes have splines on their external surfaces throughout their lengths, while each of the upper tubes has a short length of internal spline at its lower end to engage the splines of the lower shafts. The shafts are driven by electric motors 45 through a gear box 46 flange mounted at the bottom of the ram housing. The pinions are mounted on plain roller bearings with fairly large radial clearance while the shafts are mounted in ball bearings, since essentially all of the load on each splined shaft is axial and essentially all of the load on each pinion is radial.

Figure 8:
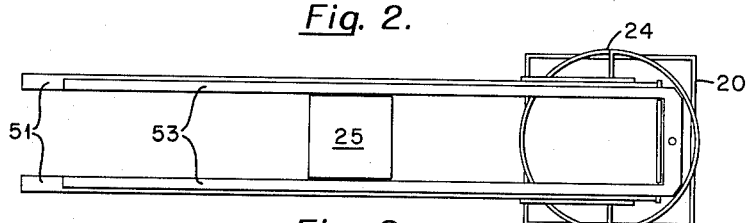
FIG. 8 is a top view of the charge head of FIG. 6.
Figure 7:
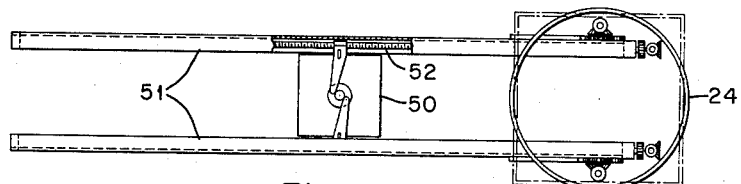
FIG. 7 is a bottom view of the charge head of FIG. 6.
Figure 6:
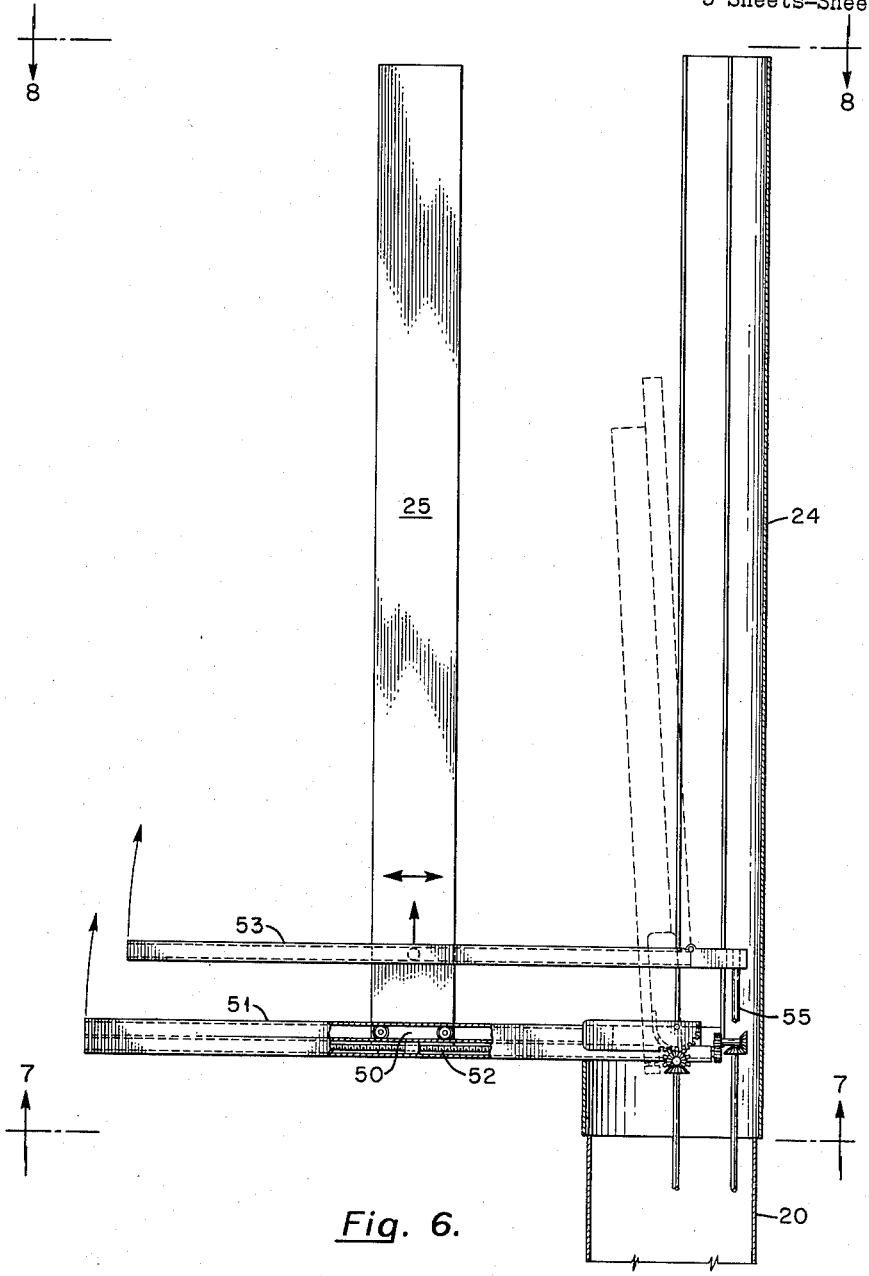
FIG. 6 illustrates the charge head in an extended position with a fuel cartridge on the radial track extension.

FIGS. 6, 7 and 8 show the ram charge head 24 used in fuel charging and discharging operations. The fuel charging and discharging ram head is basically a 13 foot long tube with a 15 inch wide U-shaped slot cut into one side to permit the lateral insertion of fuel cartridge assemblies. These fuel cartridge assemblies ride from the turntables 26 on dollies 50. A radial track extension 51 mounted on the charge head is lowered while maintaining alignment with a track from one of the turntables. The fuel cartridge is moved inward along the radial track extension to the center of the charge head. The radial track extension then swings upwardly and inwardly and the charge head is pushed upward by the ram into the reactor inlet plenum region. The radial track extension 51 then swings outwardly and downwardly from the side of the charge head. The fuel transfer dolly 50 is moved out along the track extension by the rotation of lead screws 52 indicated in FIGS. 6 and 7. The motion of the track extension 51 and lead screws 52 is accomplished through the telescoping tubes 44 shown in FIG. 3 and described above. The fuel cartridge 25 is raised from its trolley into the core matrix by a pair of lift arms 53 which are extended with the same gear sector mechanism employed with the radial track extension 51. This pair of lift arms picks up the stripper plate 54 shown in FIG. 9 at the base of the fuel cartridge assembly to apply a force along the vertical axis. The lifting operation is carried out with a vertical connecting rod 55 linked to a hydraulic cylinder mounted in the lower part of the ram where the radiation intensity is low. The actuating pressure for the hydraulic cylinder gives a direct indication of the lifting force through a pressure gauge, making it possible to limit both the lifting speed and the force to any desired value. As indicated in FIG. 6, the top of the fuel cartridge lift mechanism is guided by a crosshead 56 fitted with rollers that ride between rails in the back of the charge head.

Figures 9, 10, 11:
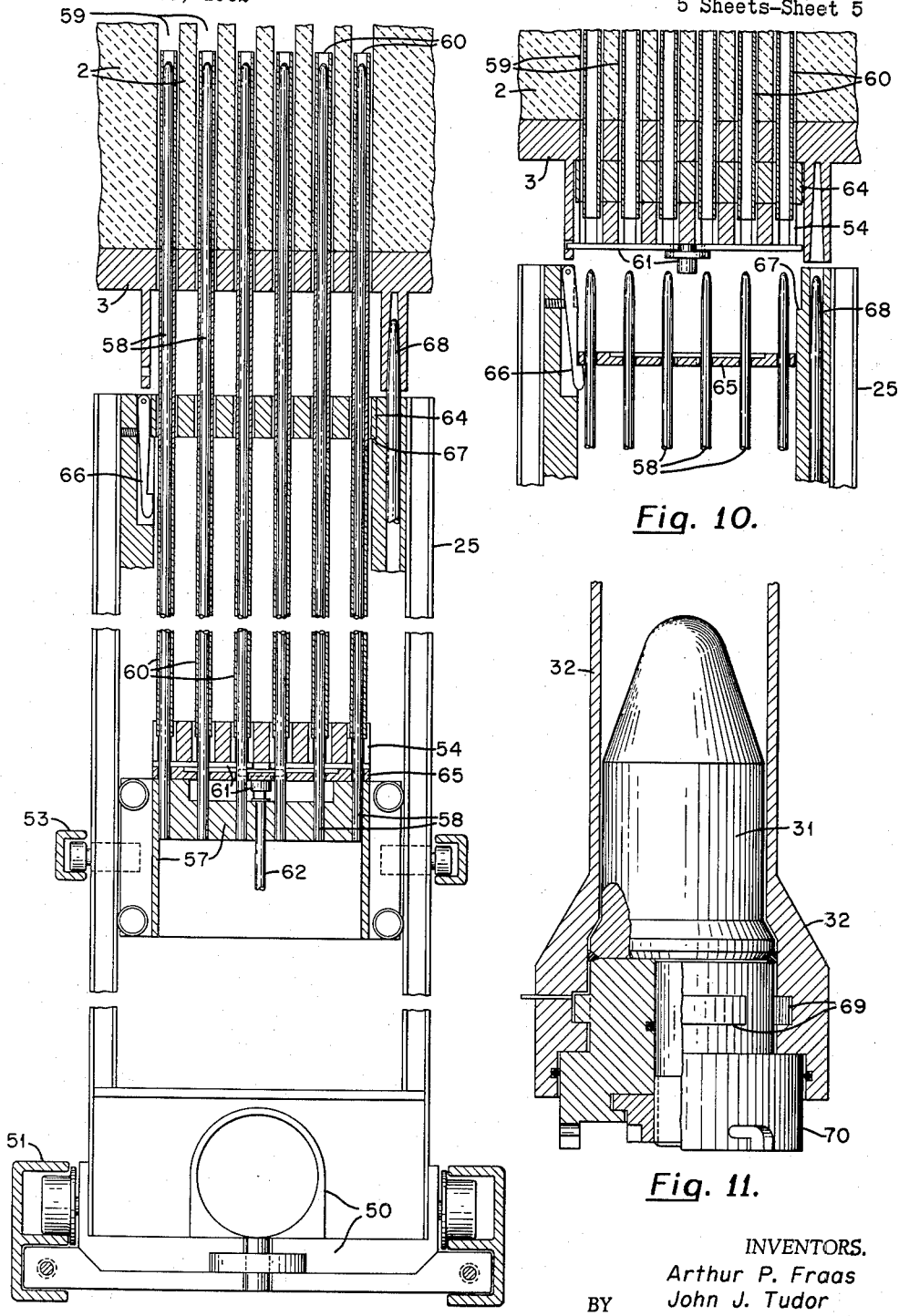
FIG. 9 is a detailed sectional view of a fuel cartridge carried by the charge head of FIG. 6.
FIG. 10 illustrates the fuel cartridge of FIG. 9 and a section of the reactor core after a fuel loading operation.
FIG. 11 shows the shield plug and vessel closure flange used to close the core pressure vessel for reactor operation.

The fuel cartridge assembly 25 is shown in detail in FIG. 9 and consists of a trolley base plate 57 from which protrudes a set of 27 tubular spindles 58 spaced to correspond with the spacing of 27 fuel channels 59 in the reactor core. The tubular ceramic fuel elements 60 are carried by these spindles after being loaded onto the spindles in a hot cell. A stripper plate 54 mounted at the base of the spindles also serves as the fuel element support plate in the reactor. The stripper plate 54 is equipped with a latching mechanism 61 actuated by a latch actuating shaft 62. The latching mechanism latches onto the core support plate 3 upon insertion of the fuel elements into the reactor core 2 thereby locking the stripper plate to the core support plate and supporting the fuel elements 60 in the fuel channels 59. The cartridge assembly spindles are then removed from the fuel channels. Fuel element removal is accomplished by reinserting the cartridge assembly spindles into the core support plate and fuel element channels, operating the latching mechanism to unlock the stripper plate from the core support plate and lock it to the trolley base plate 57, and lowering the trolley base plate and spindles to the fuel transfer dolly 50. Upper and lower guide plates 64 and 65 support and maintain alignment of spindles 58. The upper guide plate 64 has guide holes of sufficient size to permit passage of spindles loaded with fuel elements 60 during loading and unloading operations. The lower guide plate 65 rides at the base of the spindles beneath the latching mechanism 61 prior to insertion of the fuel elements into the reactor core. After insertion of the fuel elements into the core wherein the upper guide plate is held against the core support plate 3, the fuel spindles begin to withdraw. The lower guide plate 65 is held at the top of the fuel cartridge assembly by the spring loaded latch 66. The lower guide plate provides the precise alignment required for reinsertion of the unloaded spindles into the core in a fuel removal operation. Reinsertion of the fuel element spindles into the core in a fuel removal operation, serves to unlatch lower guide plate 65 from the top of the fuel cartridge assembly, permitting the lower guide plate to remain at the base of the spindle as the fuel is removed from the core. As the spindles are withdrawn from the core the upper guide plate 64 remains at the top of the fuel cartridge where it rests on a ledge 67. An alignment spike 68 insures accurate radial and angular positioning of the fuel element cartridge.

FIG. 10 illustrates the manner in which lower guide plate 65 maintains the unloaded spindles 58 in alignment. The latch 66 is shown holding the lower guide plate at the top of the spindles. Also illustrated are ceramic fuel elements 60 held in fuel element channels 59 of reactor core 2. Latching mechanism 61 is shown locked to core support plate 3 thereby supporting fuel element support plate 54 and upper guide plate 64.

A shield plug removal and insertion head is required for the ram. This head has a base similar to that of the charged heads with a similar gear box and provisions for coupling to the splines at the top of the telescoping shafts in the ram. The mechanism in the shield plug removal head engages the shield plug flange 70 shown in FIG. 11, and then imposes a torsional force on the flange to lock or unlock it. Extra force is supplied for the unlocking operation through an impact wrench device driven by one of the telescoping shafts. A breech lock 69 holds the shield plug in the reactor charge tube during reactor operation.

A wide variety of servicing heads can be installed at the top of the ram in the same manner as the charge and shield plug heads. Additional provisions are available in the ram for the special equipment of such heads. These provisions include electric power supplied to receptacles at the top of the ram through copper cable fitted with ceramic insulation. Receptacles can also be provided at the top of the ram for several tubes connected to compressed air, oxygen or acetylene gas supplies, liquid lines for decontamination spraying operations and a vacuum cleaner. Flexible metal or rubber hoses would connect the lower ends of these lines at the base of the ram with the wall of the ram housing.

In the subject design, the high precision requirements of alignment and distance of travel are met by utilizing remote viewing equipment at the loading face as well as at the top of the reactor.

During reactor operation, all components of the charge and service machine are withdrawn into a region of reduced temperature and radiation. When charging or servicing operations are to be performed, they may be initiated shortly after the reactor power has been substantially reduced. In the case of refueling, this operation would ordinarily entail replacement of 3% to 10% of the total fuel loading. It should be possible to perform this operation adequately in an eight hour period since a relatively large number of channels (27) can be simultaneously loaded or unloaded. During these operations most of the components of the charge and service machine remain in an area of reduced temperature and radiation. Furthermore, most of the "accessories" of the ram can be readily removed for inspection, maintenance and/or decontamination.

Modifications of and deviations from the embodiment shown herein may be made to permit access from the top rather than the bottom of the reactor or to apply the subject system to a liquid cooled reactor. Since many such changes may be made without departing from the spirit and scope of the present invention, the foregoing illustrative description of the embodiment should not be interpreted in a limiting sense. The invention should be limited only by the claims appended hereto.

Having thus described our invention, we claim:

1. In a neutronic reactor comprising a core structure having a multiplicity of aligned channels passing vertically therethrough for the deposition of fuel, the passage of a coolant, and for the accommodation of neutron absorbing control rods, improved means for performing charging and servicing operations on said core structure comprising in combination: a ram centrally positioned external to said core structure, a ram head mounted on one end of said ram to perform one of said service and charging operations upon said core, means for raising and lowering said ram, at least one turntable disposed in a plane lying perpendicular to the ram axis at the top of said ram when said ram is in its lowered position, said turntable providing for storage of fuel and detachable ram heads, a plurality of radial tracks disposed on said turntable, track mounted shuttle means communicating between said turntable and said ram for transferring items therebetween, means for indexing any radial track on said turntable with said shuttle, means for radially and angularly positioning said ram head, and means for operating said ram head in performing one of said operations.

2. The improved charging and servicing means of claim 1 wherein said means for raising and lowering said ram comprises at least one roller chain attached to said ram member, sprocket members supporting and driving said roller chain, and means for driving said sprocket members.

3. The improved charging and servicing means of claim 1 wherein said means for angularly positioning said ram head comprises a ram carrier ring having inner and outer portions, said ram being rigidly affixed to said inner portion, means for preventing horizontal translation of said outer portion, means for preventing rotation of said outer portion about its vertical axis, gear means rigidly mounted in said inner member, pinion means mounted in said outer member and adapted to drive said gear means, bearing means between said inner and outer member, and means of driving said pinion means to provide rotation of said inner carrier ring, whereby rotation of said inner carrier ring rotates said rigidly attached ram and said corresponding ram head.

References Cited in the file of this patent
UNITED STATES PATENTS

| | | |
|---|---|---|
| 2,946,732 | Wooton | July 26, 1960 |
| 3,066,089 | Davies | Nov. 27, 1962 |